(12) United States Patent
Chen et al.

(10) Patent No.: US 7,238,042 B2
(45) Date of Patent: Jul. 3, 2007

(54) SUPPORT ASSEMBLY FOR PORTABLE DEVICE

(75) Inventors: Yun-Lung Chen, Tu-Cheng (TW); Pei-Bin Luo, Shenzhen (CN); Ming-Xian Sun, Shenzhen (CN); Gang Su, Shenzhen (CN)

(73) Assignees: Hong Fu Jin Precision Industry (Shenzheng) Co., Ltd., Shenzhen (CN); Hon Hai Precision Industry Co., Ltd., Tu-cheng, Taipei Hsien (TW)

( * ) Notice: Subject to any disclaimer, the term of this patent is extended or adjusted under 35 U.S.C. 154(b) by 14 days.

(21) Appl. No.: 11/244,508

(22) Filed: Oct. 5, 2005

(65) Prior Publication Data

US 2006/0141856 A1  Jun. 29, 2006

(30) Foreign Application Priority Data

Dec. 24, 2004  (CN) ........................ 2004 2 0103473

(51) Int. Cl.
*H01R 13/64* (2006.01)

(52) U.S. Cl. ..................................... 439/374; 439/929
(58) Field of Classification Search ............... 350/115, 350/113; 439/374, 929
See application file for complete search history.

(56) References Cited

U.S. PATENT DOCUMENTS

| 5,799,914 | A | 9/1998 | Chivallier et al. |
| 6,193,546 | B1 | 2/2001 | Sadler |
| 6,619,982 | B2 * | 9/2003 | Tamura ....................... 439/534 |

* cited by examiner

*Primary Examiner*—Khiem Nguyen
(74) *Attorney, Agent, or Firm*—Morris Manning & Martin LLP; Tim Tingkang Xia, Esq.

(57) ABSTRACT

A support assembly for a portable device includes a base (10), a support body (20) and a holder (30) for holding the portable device. The support body extends from the base. A protrusion (25) is formed on the support body. The holder defines a cutout (37) and a groove (375). The cutout receives the support body. The protrusion of the support body slides into the groove of the holder to detachably mount the holder to the support body.

17 Claims, 4 Drawing Sheets

SUPPORT ASSEMBLY FOR PORTABLE DEVICE

BACKGROUND OF THE INVENTION

1. Field of the Invention

The present invention relates to a support assembly, and more particularly to a support assembly for holding and supporting a portable device therein.

2. General Background

As the intercommunion in people becomes more and more frequently, more portable devices have being needed for people to conveniently take. In modern time, these portable devices include mobile telephone, personal digital assistant (PDA), and so on. Users may use the portable devices at their desks or other workstations now and then.

In order to facilitate convenient and effective use of the portable device on the desk, some cradle devices for holding the portable devices have being developed. A cradle device for a portable radio terminal has being disclosed. The cradle device includes a holder part for holding a portable radio terminal and a fixed part for releasably supporting the holder part. The fixed part has a ball joint accommodated thereon, the ball joint having a curved surface and an engaging surface, and a locking hook spaced from the ball joint and extending from the fixed part. The holder part has an aperture and a stopper extending into the aperture and a slot formed in the holder part and spaced from the aperture. The holder part assumes a locked position when the ball joint is accommodated in the aperture, the engaging surface engages the stopper and the hook extends into and engages the slot. However, the holder part is not easily disassembled form the fixed part for changing different holders to hold different portable radio terminals.

What is needed, therefore, is a support assembly which is easy to be changed to suit for holding different portable devices.

SUMMARY

A support assembly for a portable device includes a base, a support body and a holder for holding the portable device. The support body extends from the base. A protrusion is formed on the support body. The holder defines a cutout and a groove. The cutout receives the support body. The protrusion of the support body slides into the groove of the holder to detachably mount the holder to the support body.

Other objects, advantages and novel features of the invention will become more apparent from the following detailed description when taken in conjunction with the accompanying drawings, in which:

DETAILED DESCRIPTION OF THE INVENTION

Figure 1:
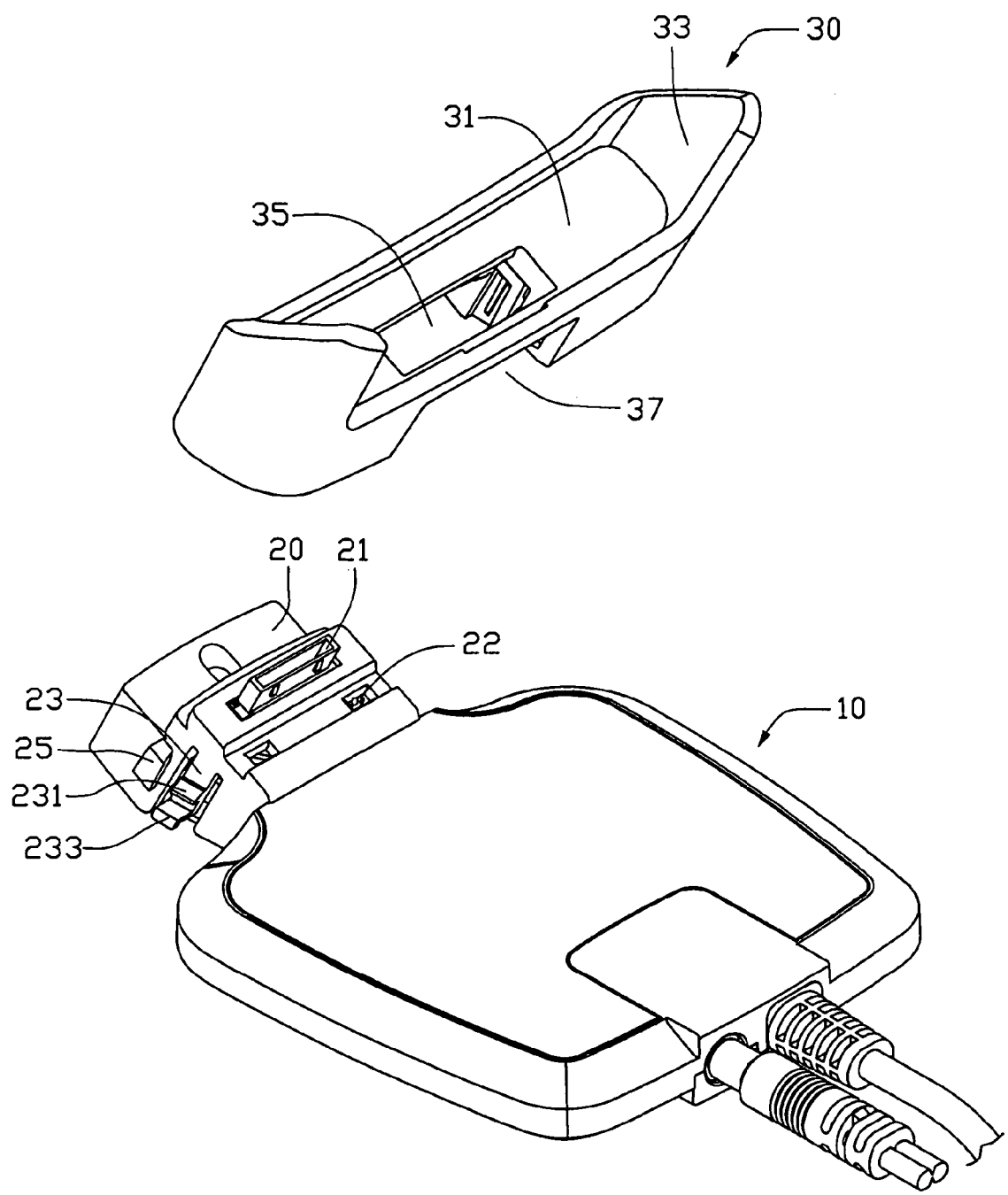
FIG. 1 is an exploded, isometric view of a support assembly for a portable device of a preferred embodiment of the present invention, the support assembly including a base, a support body and a holder.
Figure 2:
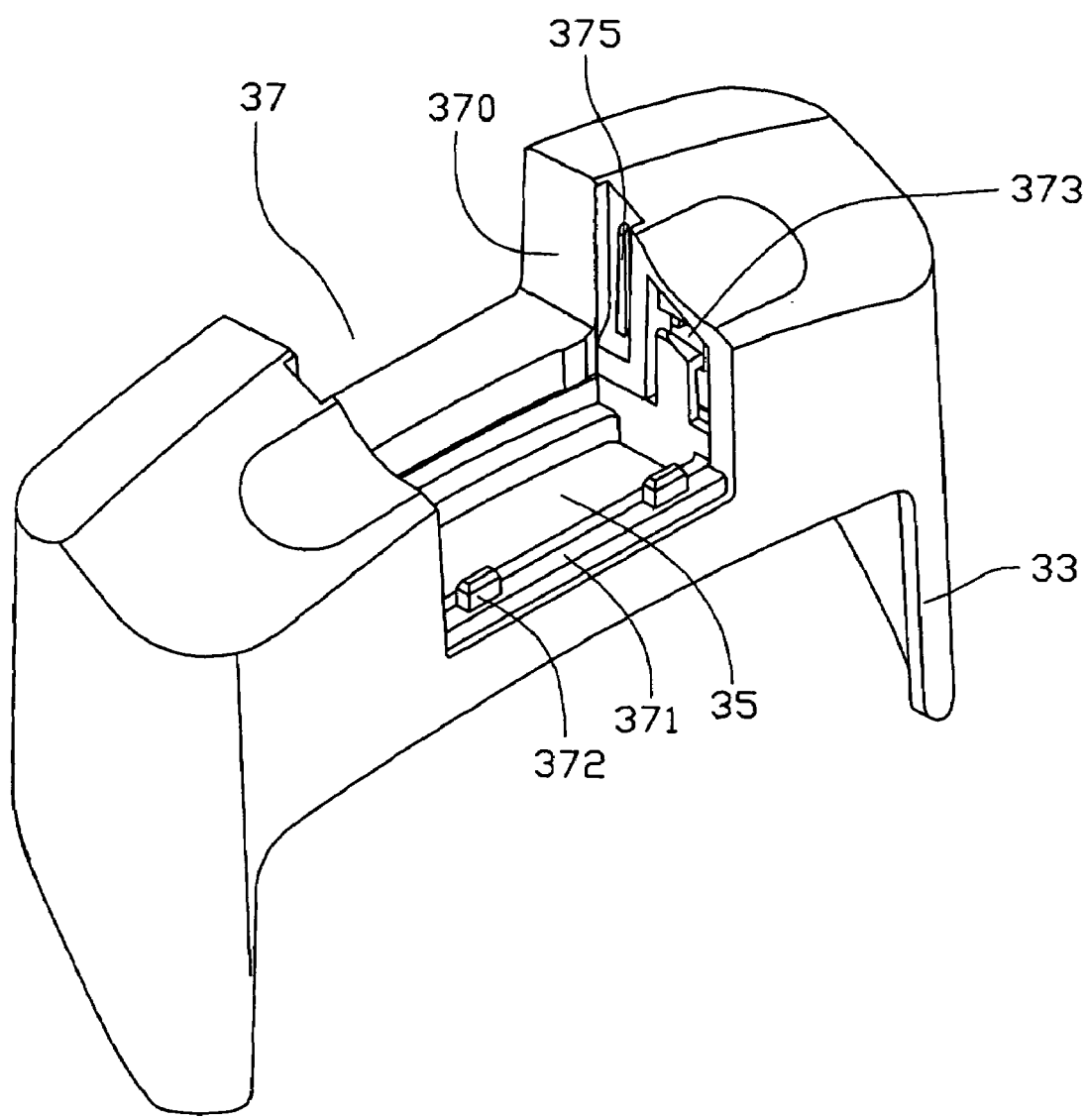
FIG. 2 is another isometric view of the holder of FIG. 1.

Referring to FIGS. 1 and 2, a support assembly for a portable device in accordance with a preferred embodiment of the present invention includes a base 10, a support body 20 and a holder 30 mounted on the support body 20.

The base 10 has a flat bottom for being placed on a desk or other workstation thereby.

The support body 20 extends slantingly from an end of the base 10. Two sides of the support body 20 each have an elastic hook 23. The hook 23 includes a barb 231 in a middle portion thereof, and a stop 233 at a bottom thereof. A wedge-shaped protrusion 25 is formed on either side of the support body 20 besides the hook 23. The protrusion 25 is small at the root and then becomes larger gradually. A connector 21 is extended from a top of the support body 20 for connecting with the portable device. The connector 21 can be used for powering the portable device, or for connecting the portable device to another device, and so on. Two positioning holes 22 are defined in the top of the support body 20.

The holder 30 includes a bottom wall 31 and a plurality of side walls 33 to form a receptacle for receiving the portable device therein. A bottom of the holder 30 defines a cutout 37 corresponding to the support body 20. A slot 35 is defined in the bottom wall 31 for communicating the cutout 37 with the receptacle. Opposite sides of the cutout 37 are a pair of inner walls 370 corresponding to the two sides of the support body 20. A securing hole 373 and a groove 375 are defined in either inner wall 370. The groove 375 is shaped corresponding to the protrusion 25 for having the protrusion 25 sliding therein. A pair of positioning pins 372 is formed on an edge 371 of the cutout 37.

Figure 3:
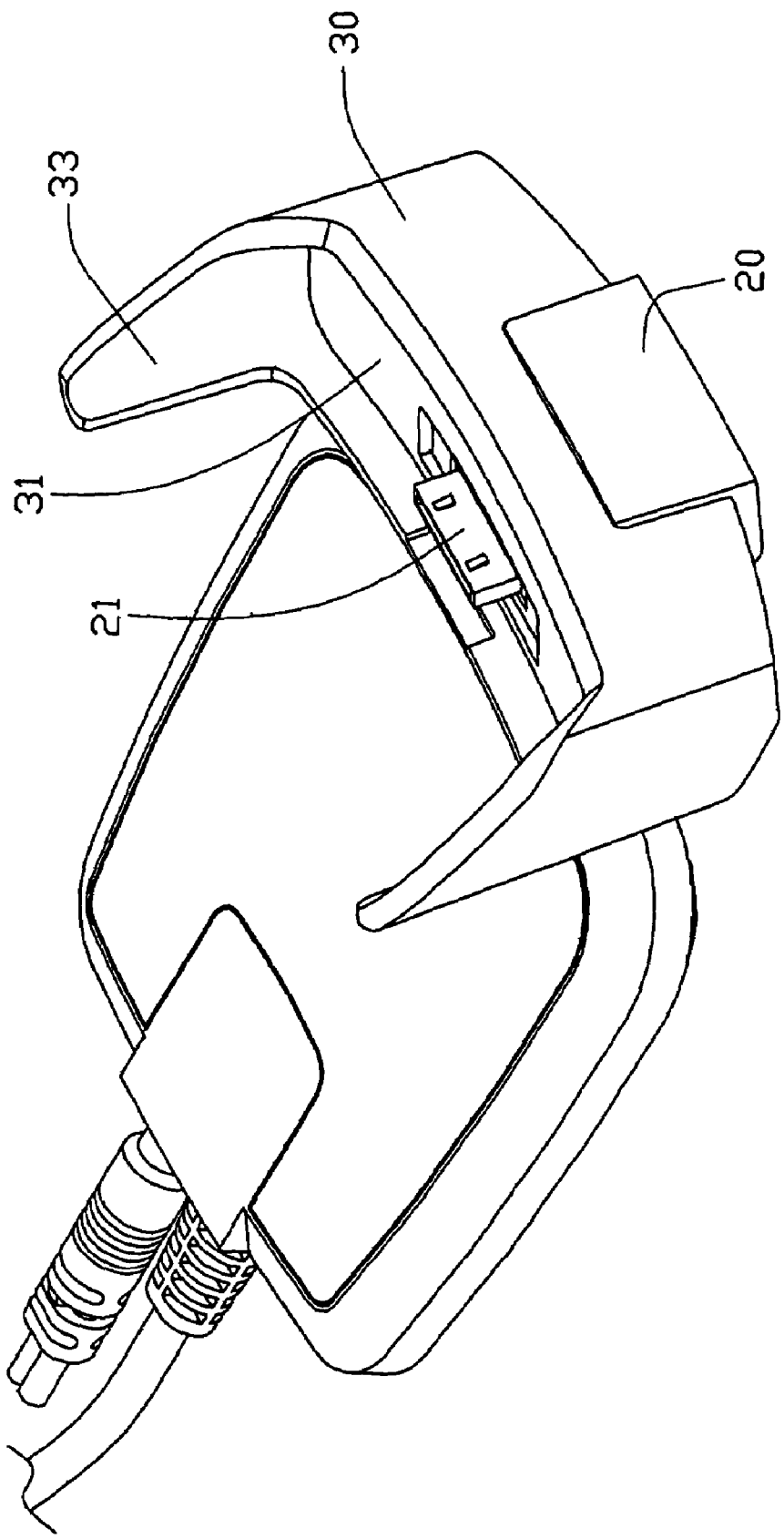
FIG. 3 is an assembled view of FIG. 1.
Figure 4:
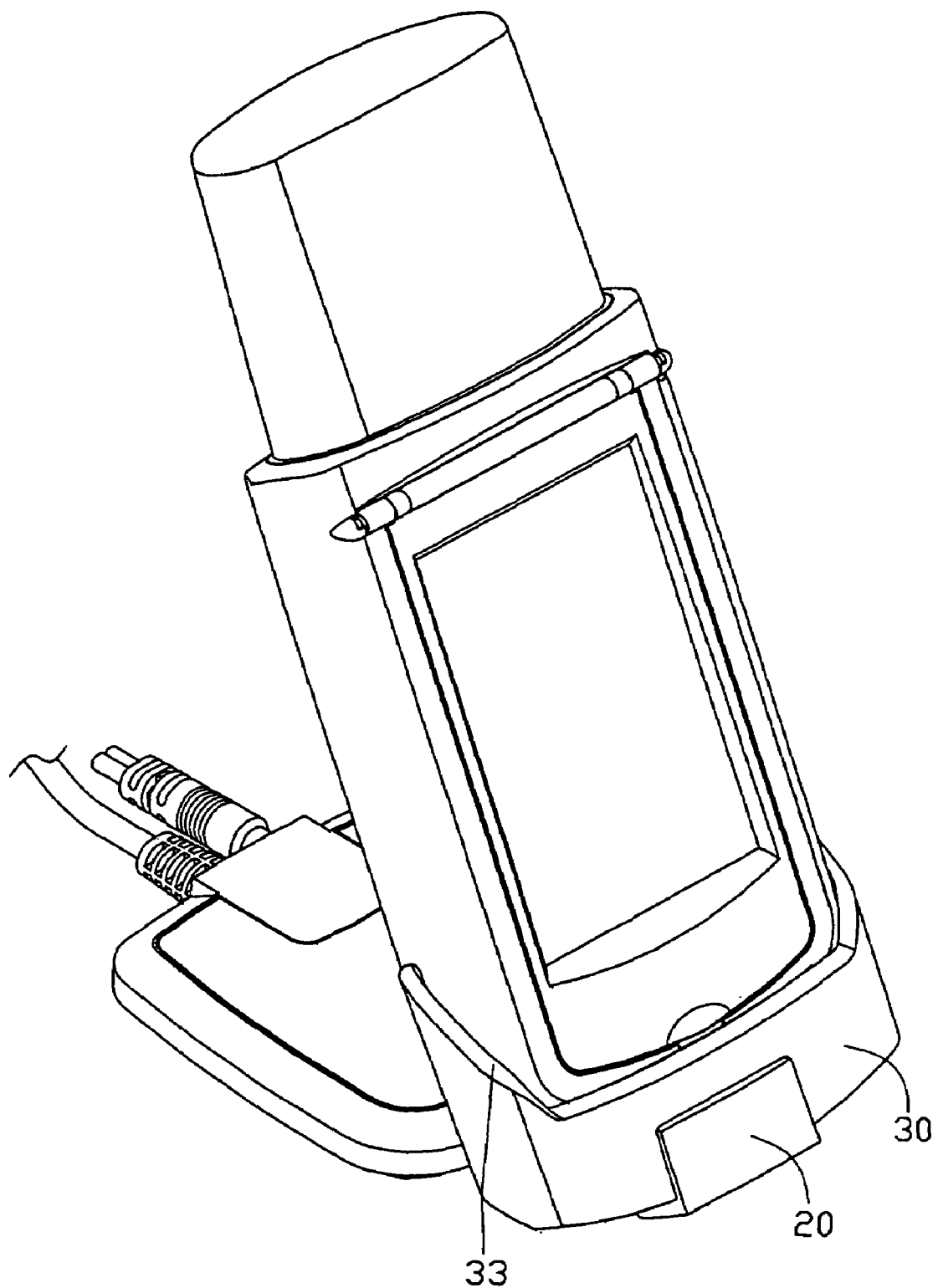
FIG. 4 is another assembled view with a portable device.

In assembly, the holder 30 is put on the support body 20 with the support body 20 received in the cutout 37 and the connector 21 extending through the slot 35. The elastic hooks 23 are extruded by the inner walls 370 of the cutout 37, and the protrusions 25 slide into the grooves 375. The holder 30 is slid downwardly until the barbs 231 of the hooks 23 engage in the securing holes 373 respectively. The positioning pins 372 of the holder 30 are positioned into the positioning holes 22 of the support body 20. At the same time, a bottom of the holder 30 resists with the stops 233 of the clips 23. So the holder 30 is mounted to the support body 20. Referring to FIGS. 3 and 4, the portable device is then put into the holder 30.

In disassembly, the stop 233 of the clips 23 is pressed to free the barbs 231 of the hooks 23 from the securing holes 373 of the holder 30. Then the holder 30 is pulled upward to be disassembled from the support body 20.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A support assembly for a portable device, comprising:
   a base;
   a support body extending from the base, a protrusion formed on the support body; and
   a holder configured to receive the portable device therein along a direction, the holder defining a cutout for coupling with the support body, and a groove corresponding to the protrusion;
   wherein the protrusion of the support body slides into the groove of the holder along the same direction as the holder receives the portable device to detachably mount the holder to the support body.

2. The support assembly as described in claim 1, wherein the support body comprises a hook.

3. The support assembly as described in claim 2, wherein the hook comprises a barb, and a securing hole is defined in an inner wall of the cutout for engaging with the barb of the hook.

4. The support assembly as described in claim 2, wherein a stop is formed at a bottom of the hook.

5. The support assembly as described in claim 1, wherein a positioning hole is defined in the support body, and a positioning pin is formed on an edge of the cutout to be inserted in the positioning hole.

6. The support assembly as described in claim 1, wherein the holder comprises a bottom wall and a plurality of sidewalls to form a receptacle.

7. The support assembly as described in claim 6, wherein a slot is defined in the bottom wall for communicating the cutout with the receptacle.

8. The support assembly as described in claim 7, wherein the support body comprises a connector extending through the slot of the holder.

9. A support assembly for a portable device, comprising:
a base with a support body extending therefrom, the support body comprising a hook formed on a side of the support body; and
a holder configured to form a receptacle to hold the portable device therein, the holder defining a cutout for receiving the support body, and a securing hole to engage with the hook to detachably mount the holder to the base;
wherein the holder comprises a bottom wall, and a slot is defined in the bottom wall for communicating the cutout with the receptacle, the support body comprises a connector extending through the slot of the holder.

10. The support assembly as described in claim 9, wherein the hook comprises a barb for engaging in the securing hole.

11. The support assembly as described in claim 10, wherein a stop is formed at a bottom of the hook.

12. The support assembly as described in claim 9, wherein a groove is defined in the holder, and a protrusion is formed on the support body to slide in the groove.

13. The support assembly as described in claim 12, wherein the protrusion is wedge-shaped, and the groove is shaped corresponding to the protrusion.

14. The support assembly as described in claim 9, wherein a positioning hole is defined in the support body, and a positioning pin is formed on an edge of the cutout to be inserted in the positioning hole.

15. An assembly comprising:
a base capable of being positioned to provide a support basis for a portable device, and defining a support body extending therefrom and having an electrical connection mechanism exposable thereon; and
a holder configured to supportively hold said portable device in a predetermined way, said holder capable of engagably enclosing mostly said support body so as to be installed beside said base and perform holding of said portable device according to said predetermined way, and said electrical connection mechanism being reachable by said portable device after installation of said holder to said support body of said base.

16. The assembly as described in claim 15, wherein a cutout is formed in said holder so as to accommodate said support body therein.

17. The assembly as described in claim 15, further comprising another holder configured to supportively hold a portable device of another kind in said predetermined way and capable of engagably enclosing mostly said support body so as to be installed beside said base.

* * * * *